United States Patent [19]
Geisinger

[11] Patent Number: 6,123,231
[45] Date of Patent: Sep. 26, 2000

[54] PLASTIC CONTAINER WITH DRAIN BACK SPOUT AND METHOD AND APPARATUS FOR MAKING SAME

[75] Inventor: Gregory A. Geisinger, Toledo, Ohio

[73] Assignee: Owens-Brockway Plastic Products Inc., Toledo, Ohio

[21] Appl. No.: 09/114,481

[22] Filed: Jul. 13, 1998

[51] Int. Cl.[7] ............................................ B65D 1/16
[52] U.S. Cl. ................................................. 222/109
[58] Field of Search .................... 222/111, 109, 222/482

[56] References Cited

U.S. PATENT DOCUMENTS

| | | |
|---|---|---|
| 2,804,654 | 9/1957 | Sherman . |
| 4,640,855 | 2/1987 | St. Clair . |
| 4,917,269 | 4/1990 | Fuchs et al. . |
| 4,989,757 | 2/1991 | Krall . |
| 5,020,692 | 6/1991 | Darr . |
| 5,114,659 | 5/1992 | Krall . |
| 5,207,356 | 5/1993 | Krall . |
| 5,462,202 | 10/1995 | Haffner et al. . |
| 5,566,862 | 10/1996 | Haffner et al. .......................... 222/111 |

*Primary Examiner*—Kevin Shaver
*Assistant Examiner*—Thach H. But

[57] ABSTRACT

A one-piece self-draining container and method and apparatus for forming same. The container includes a body and a finish wall extending upwardly from a body opening. The finish wall surrounds a dispensing spout which extends above the top of the wall. A frustoconical web joins the finish wall and the dispensing spout to form a drain apron gutter channel having a relatively steeply inclined cone angle. A drain opening is defined adjacent the channel for draining fluid from the channel into the container body. A removable cap having a depending skirt defining a thread which mates with an internal thread on the container wall to thereby threadably engage and close the container. The method is performed on the type of extrusion-injection blow molding machine as generally disclosed in U.S. Pat. No. 2,804,654 as modified in accordance with the invention to form the web wall in situ with a frustoconical configuration of uniform cross sectional thickness.

8 Claims, 4 Drawing Sheets

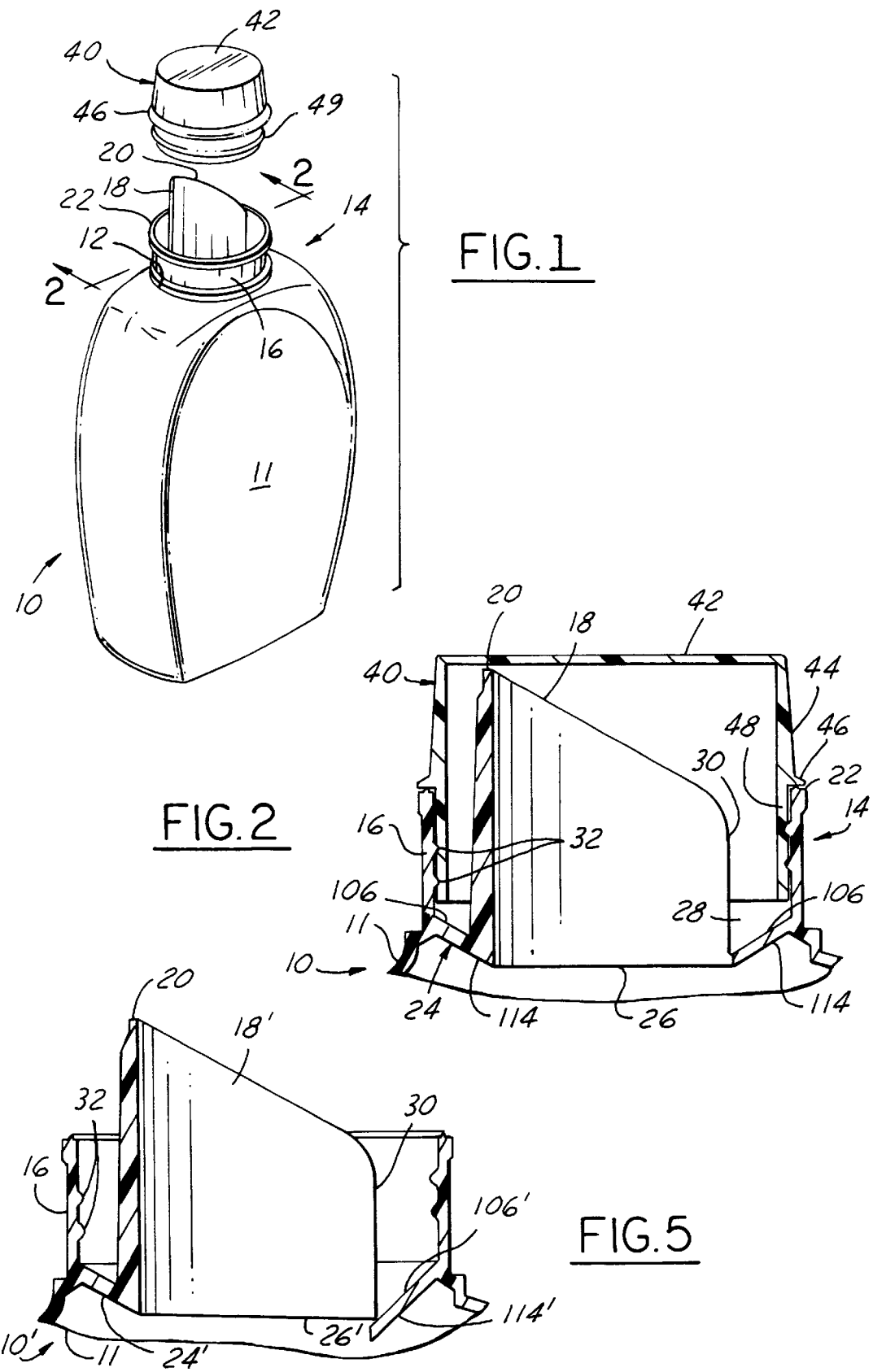

PLASTIC CONTAINER WITH DRAIN BACK SPOUT AND METHOD AND APPARATUS FOR MAKING SAME

FIELD OF THE INVENTION

This invention relates to plastic containers and more particularly to a plastic container molded in one piece so as to include a drain back spout as molded.

BACKGROUND OF THE INVENTION

In dispensing liquid from containers wherein only a portion of the contents of the container is used at any one time, as is the case with many products such as liquid detergents and bleaches, the consumer is concerned with the messiness which occurs from drops of the liquid contents draining down the neck and side of the container upon completion of the pouring. Thus, when a bottle having an upper neck is turned from its normal upright storage position to an inverted dispensing position and then back to its upright position, a few drops of such liquid will invariably drain down the outside of the neck of the container. A number of prior art container designs have disclosed various drain back spout (DBS) features for capturing such excess fluid and causing it to drain back into the container rather than drip down the neck and side.

Many of such DBS designs require a multiplicity of pieces which are assembled in a post molding operation, or require a re-shaping operation to re-position the spout. The self-draining containers of U.S. Pat. Nos. 4,989,757 and 5,114,659 overcame such problems encountered with multiple part self-draining containers by providing a one-piece self-draining container and method and apparatus for making the same so that the container can be molded in a single machine while incorporating a drain back spout feature as an integral part of the container, i.e., as part of the finish formed during the container molding operation. Thus, the only other element required for a complete package is a suitable removable closure for sealing the container. Such one-piece containers are much more economical to produce than a container requiring multiple pieces because the container is completed upon molding and hence post-molding operations are not required.

In the various embodiments of one-piece self-draining containers disclosed in the aforementioned '757 patent, the dispensing spout is equal to or greater in diameter than the neck of the container, regardless of which of the methods and type of machine is employed in making the same. One such '757 patent container is made by a type of blow molding characterized as injection-extrusion blow molding utilizing a blow molding machine of the type disclosed in U.S. Pat. No. 2,804,654 (hereinafter "'654 machine") which is in widespread use by the assignee of the present invention. When so utilizing the '654 machine to make the container of the '757 patent, the lower or container-interior surface of the web member extends radially outwardly from the neck of the narrow-shouldered container body and at right angles to the axis A of the neck, whereas the upper or container-exterior surface of the web is slightly inclined in order to promote some limited liquid drainage back to the lowermost portion of the gap in the spout when the container is returned to its upright storage position.

The self-draining container of U.S. Pat. No. 5,114,659 is likewise made by a method performed by the '654 machine in order to produce a one-piece self-draining container. However, the '659 patent container differs in configuration from that of the '757 patent in that the pour spout is smaller in diameter than the neck of the container and hence is better adapted to the broad shoulder type container body shown in the '659 patent and hence is preferred for many applications.

In addition, the '659 patent discloses a method of molding which provides internal threads with superior thread definition and lack of distortion by making the thread extend for at least two complete turns, i.e., 720°, so that at any axial section of the neck wall, there will always be at least two thread segments. This overcame the problem of thread distortion when stripping of containers having a thread with less than two full turns that previously resulted in producing containers which, although functionally usable, were less than commercially desirable. This improved stripping action, as will be seen from the '659 patent, was accomplished with a container neck of smaller diameter than the integral portion of the upper shoulder area of the container body to which the neck is joined, and also, of course, with a pour spout having a smaller diameter than that of the container neck.

However, in the one-piece self-draining container of the '659 patent, like that of the container of FIG. 3 of the '757 patent, the bottom or interior surface of the apron web extended radially in a plane perpendicular to the axis of the neck, and hence the upper surface of the web could only be slightly inclined to thereby somewhat promote the aforementioned gravity drain back. The inclination of the web upper surface relative to the web lower surface is limited as a practical matter because excessive plastic thickness in the web negatively affects the mold cycle time and hence production efficiency. Such asymmetric cross-sectional shape of the web wall also produces some production problems with respect to side loading of the tooling and tooling alignment.

Due to the foregoing limitations, the ledge formed by the web at the base of the pour spout is nearly flat. Hence with prior art DBS containers made in accordance with the '659 patent for broad shouldered containers the spillage residue from the product dispensed from the container tends to remain inside the finish area. This remaining residual drain back product can result in a messy package for the consumer when pouring or re-applying the closure. Accordingly, there has existed a need for many years for improving DBS configuration in such one-piece plastic containers to better promote gravity drain back into the container without sacrificing the advantages of the method, apparatus and improved thread definition of the '659 patent as practiced in '654 machines and as applied to a broad-shoulder container body.

OBJECTS OF THE INVENTION

Accordingly, among the objects of the present invention are to provide a new and novel one-piece self-draining container which can be molded on a single machine, which requires no assembly operations, which has a steep inclination of the web drain wall that better promotes the product to drain away from the container finish back into the container, which enables the container drain web wall to be made of uniform plastic thickness and sufficiently thin so as not to negatively affect production cycle time.

Another object of the present invention is to provide an improved method and apparatus for making a container of the aforementioned character on a widely used '654 type machine that is economically retrofitted in accordance with the invention with a minimum of component changes and modifications, that retains the advantages of the method and container of the '659 patent, which eliminates the problems faced in the past with side loading of the tooling and tooling alignment concerns when fashioning the prior web of non-uniform thickness and non-parallel upper and lower surfaces, and that enables an improved container of the aforementioned character to be made in a rapid, reliable and economical manner with already available production equipment.

SUMMARY OF THE INVENTION

In general, and by way of summary description and not by way of limitation, the present invention accomplishes the foregoing objects by providing an improved one-piece self-draining container and improved method and improved apparatus for forming the same. The container includes a body and a finish wall extending upwardly from a body opening. The finish wall surrounds a dispensing spout which extends above the top of the wall. A drain back apron web joins the finish wall and the dispensing spout and has a generally frustoconical contour to form a drain apron gutter channel having a relatively steeply inclined cone angle. A drain opening is defined adjacent the gutter channel, preferably in the form of a gap at the rear of the spout, for draining fluid from the channel into the container body. The apron web is preferably constructed and arranged to have generally parallel upper and lower wall surfaces sloping downwardly toward the spout in the container upright position.

The method of the invention for constructing the improved container is performed on a modified conventional '654 type extrusion/injection blow molding machine that is operated in the conventional manner in a normal cycle so that the container is manufactured by a process in which at least the neck, dispensing spout, annular finish wall, apron web, and the drain gap through which liquids flow are formed in a first mold in one operation and the body is thereafter formed by blow molding, with no post-molding reconfiguring operations required for those portions formed in the first mold in order to provide the final as-molded container cnfiguration. The conventional '654 molding machine is modified by constructing and arranging the web forming portion of the injection mold cavity tooling to mold form a generally frustoconical upper surface on the web, and constructing and arranging the end surface of the extrusion die head that closes the injection mold cavity so as to mold form a generally frustoconical lower surface on the web. Preferably, this is accomplished by recessing the central surface on the mandrel end that mates with the lower end of the injection mold core pin so that these parts meet in a central abutment zone spaced below the annular extruder outlet formed between the upper end of the mandrel and the bushing that surrounds the mandrel in the extrusion tooling. A frustoconical surface is then formed on the mandrel end so as to encircle the recessed mandrel central surface and to taper upwardly and radially outwardly therefrom to intersect with the plane of the annular extrusion die outlet. Likewise the lower end of the finish insert sleeve of the injection mold tooling is reconfigured complemental to the mandrel end frustoconical surface so that the mold cavity surfaces define therebetween a mold cavity adapted to form the apron web such that it has a generally frustoconical contour.

BRIEF DESCRIPTION OF THE DRAWINGS

The foregoing as well as other objects, features and advantages of the present invention will become apparent from the following detailed description of the best mode presently known to the inventor of making and using the invention, from the appended claims and from the accompanying drawings wherein:

FIG. 1 is a perspective view showing a first embodiment of a container constructed according to the present invention, with a cap positioned above the container:

FIG. 2 is a fragmentary cross-sectional view taken along the line 2—2 in FIG. 1 showing the top portion of the container of FIG. 1 with the cap in place to thereby provide the first embodiment self-draining package;

FIG. 5 is a fragmentary cross-sectional view of the finish portion of a second embodiment of a one-piece self-draining container also constructed in accordance with the invention.

DETAILED DESCRIPTION OF THE PREFERRED EMBODIMENTS

FIRST EMBODIMENT CONTAINER

Figure 3:
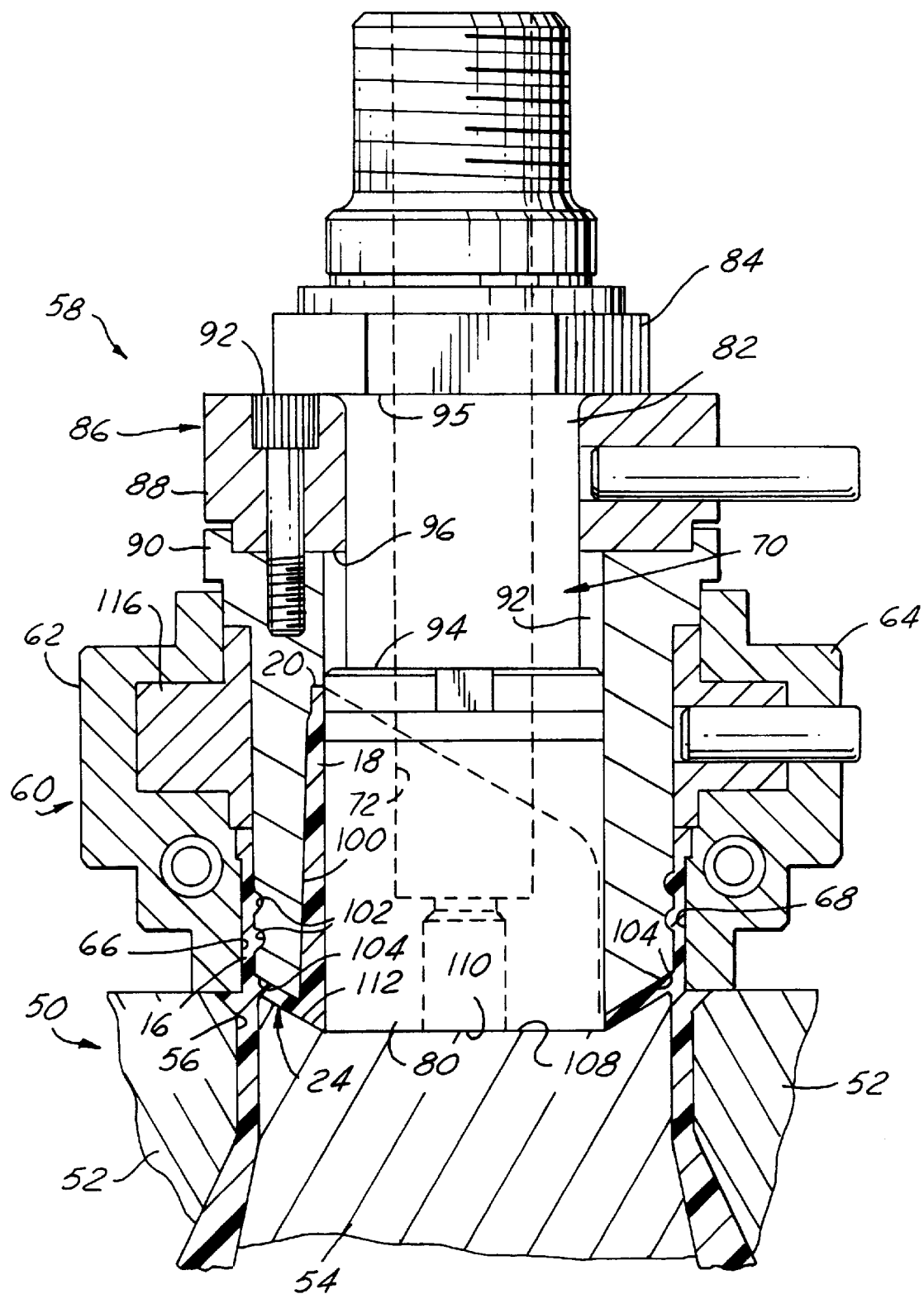
FIG. 3 is a fragmentary view, partially in center axial cross section and partially in elevation, of a '654 type machine modified in accordance with the invention to produce the first embodiment container, and showing the finish portion of the container being extrusion injection molded in accordance with the method of the invention.

Referring in more detail to the accompanying drawings, FIGS. 1 and 2 illustrate a first embodiment of a self-draining container 10 constructed in accordance with the present invention. While the self-draining container 10 as depicted is a plastic bottle specifically designed for liquids, other self-draining containers which fall within the scope of the present invention may be constructed of other materials and used to contain liquids, powders or granules.

The self-draining container 10 includes a body portion 11 of the "broad-shouldered"type which terminates in an opening 12 through which the contents of container 10 can be dispensed. An integrally formed (i.e., as used herein, the term "integral" means a one-piece construction as molded) dispensing portion 14, commonly termed a "finish", extends from and communicates with body portion 11. Finish 14 includes a circular neck wall 16 which extends angularly around the body opening 12. A dispensing spout 18 is located within and is encircled by wall 16 and includes an upper end pouring lip 20 that extends above a top end edge 22 of wall 16.

In accordance with one of the principal features of the present invention, the outside diameter of spout 18 is smaller than the inside diameter of wall 16, and a steeply inclined drip collecting apron 24 in the form of a frustoconical web wall extends between wall 16 from an elevation below top edge 22 to the lower end edge 26 of spout 18 to thereby connect the spout to the container neck. In the embodiment of FIGS. 1 and 2, the cone angle of web 24 is approximately 30° and web 24 is circumferentially continuous through 360° and connects wall 16 to the lower circular edge 26 of spout 18. Web 24 together with neck wall 16 and pour spout 18 define a drain gutter channel 28 into which fluid flowing back down about the exterior of spout 18 and the interior of closure 40 may drain under the influence of gravitational forces when container 10 is uprighted after it has been inverted for pouring. Liquid then flows from gutter 28 back into the container 10 by entering the axially extending spout rear gap that is defined between the pair of spaced apart rear edges 30 of spout 18 (only one edge 30 being shown in FIG. 2). Web 24 should extend at least half way around finish wall 16, and preferably all the way around as shown in FIG. 2, to thereby prevent flow of liquid from the container interior into gutter channel 28 when the container 10 is partially inverted to a pouring position.

The inner surface of wall 16 has formed therein a thread 32 which, in accordance with the aforementioned '659 patent, extends at least two complete turns so that any section cut axially through such wall 16 will have two separate and distinct portions of the thread 32. As set forth in the '659 patent, forming a container having a spout 18 and an encircling wall 16 with an internal thread 32 of such length permits container 10 to be stripped from the injection mold without causing distortion to thread 32.

Referring to both FIGS. 1 and 2, a closure or cap 40 includes a top 42 and a depending sidewall 44. A sealing ring 46 extends radially outwardly from sidewall 44 and a cylindrical skirt 48 depends downwardly below ring 46. External threads 49 are formed on an exterior surface of skirt 48 and cooperate with threads 32 of the container finish 14 for threadably engaging and removing cap 40 relative to container 10. It will be understood that in other embodiments of the invention, the finish threads 32 may be provided on the exterior of wall 18 to mate with cap threads located on the interior of the cap skirt.

FIRST EMBODIMENT BLOW MOLDING METHOD AND MACHINE

Figure 4:
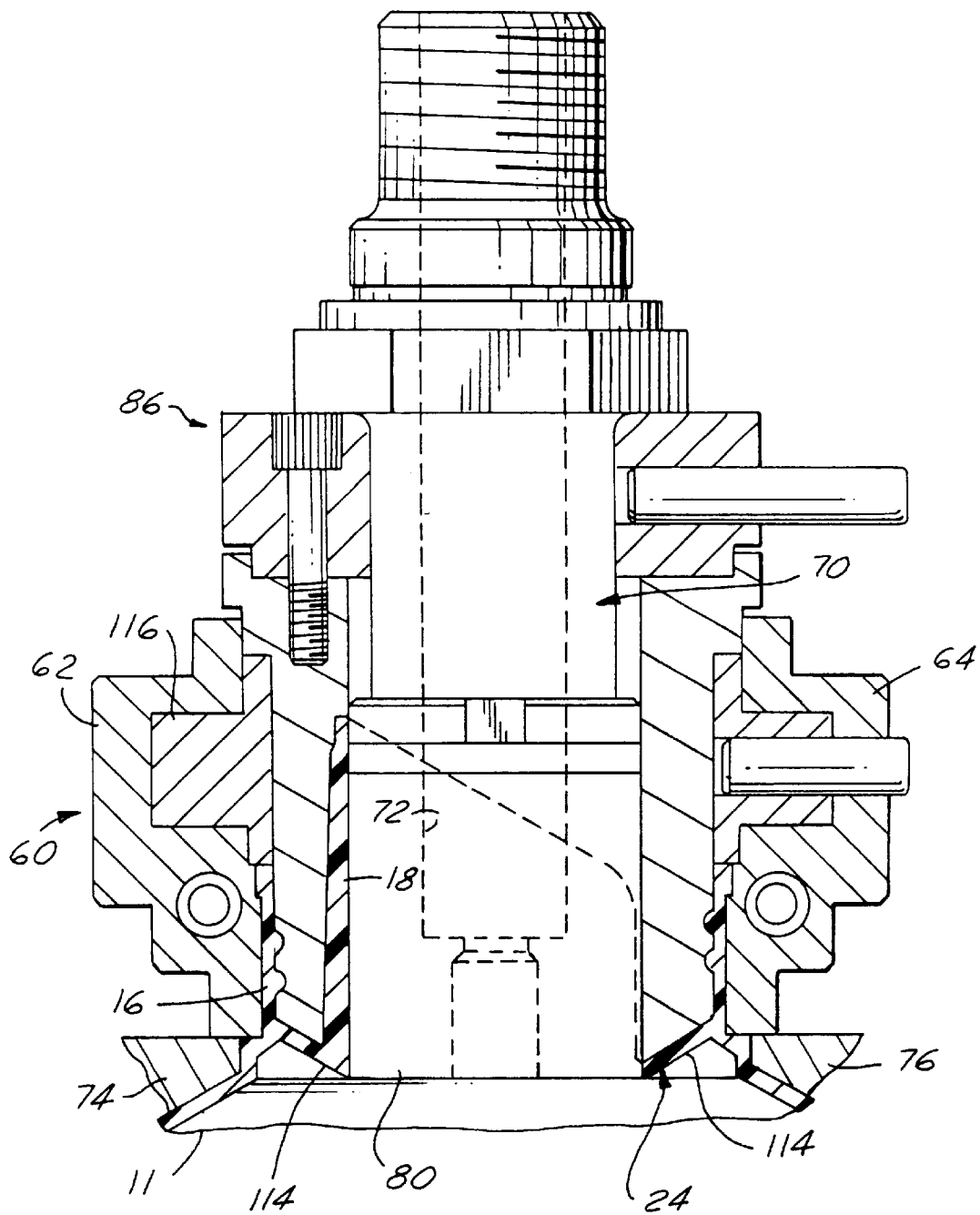
FIG. 4 is a fragmentary sectional view similar to that of FIG. 3 but with the extrusion tooling removed from the injection molding tooling and replaced by blow mold halves, FIG. 4 showing a portion of the closed blow-mold with the body portion of the container blown therein.

Referring to FIGS. 3 and 4, the self-draining container 10 may be produced in one-piece within the normal cycle of a blow molding machine of a type known as the aforementioend '654 machine, as modified in accordance with the invention. This type of blow molding may be characterized as injection/extrusion blow molding and is used by the assignee of the present invention and others with a machine herein designated as the '654 machine. No post-molding container reconfiguring operations are needed to produce the self-draining finish configuration on this type of machine. An injection/extrusion tooling portion of a '654 machine is generally indicated by the reference numeral 50 in FIGS. 3 and 4. Details of a '654 machine, mode of operation, and method practiced thereby are disclosed in U.S. Pat. No. 2,804,654, which is incorporated herein by reference. Further details of the stripping of the container from the injection mold without causing distortion of the threads 32 may be found in the aforementioned U.S. Pat. No. 5,114, 659, which is also incorporated herein by reference.

In the method utilized by the '654 machine, both existing and as modified in accordance with the invention disclosed herein, the upper neck or finish portion of the container is first injection molded in the injection mold tooling of the machine. Upon completion of the injection molding step, the injection mold tooling is raised away from the orifice of the injection/extrusion die head tooling while a length of heated and plasticized tubing is extruded from the die head. The tubing is integrally connected to the injection molded finish and is therefore drawn upwardly as the tubing is extruded. After the proper length of the tubing has been extruded, blow mold halves of the '654 machine close around the tubing and air is introduced through the injection mold tooling assembly to expand the tubing in the closed blow mold to form the remainder (i.e., body) of the container. These steps are shown and described in the aforementioned U.S. Pat. No. 2,804,654.

The injection step is shown in FIG. 3 wherein the extrusion die head tooling is generally designated by the numeral 50 and includes a bushing 52 and a mandrel 54 which cooperate to define an annular extrusion orifice 56 through which the heated and plasticized material is expelled upwardly into the injection mold cavity defined by the finish and neck rink assembly injection mold tooling 58 juxtaposed to the extrusion die tooling 50. Tooling 58 includes a movable neck ring assembly 60 which is mounted (by means not shown) for movement downwardly into engagement with the bushings 52 of the extrusion tooling 50 and in registry with the extrusion orifice 56 during the injection molding step, and for movement upwardly during the extrusion step to thereby draw the oncoming tubing upwardly away from the orifice 56 as it is extruded therefrom. The neck ring assembly 60 includes neck ring halves 62 and 64 which can open and close radially and which have interior wall portions 66 and 68, respectively, against which the exterior surface of the annular wall 16 of the container finish is molded. The neck ring assembly 60 also includes a core pin 70 having a blow passageway 72 extending axially therethrough through which pressurized air may be introduced into the extruded tubing via blow passageway 72 after such tubing is enclosed within the blow mold mating halves 74, 76 (FIG. 4) to thereby expand the tube in the blow mold and form the body 11 of container 10.

Core pin 70 has an enlarged diameter head portion 80 at its lower end that is contoured on its exterior surface to provide the mold cavity surface for forming the interior surface of container spout 18. Core pin 70 has a reduced diameter shank portion 82 that extends from head 80 up to a radially protruding collar portion 84. A finish insert sleeve subassembly 86, made up of a collar part 88 and a sleeve 90 removably fastened to the underside thereof by machine bolts 92, encircles shank 82 of core pin 70 and defines a recessed area 92 extending from the upper edge 94 of core pin head 80 to the undersurface ledge 96 of collar 88 of the finish insert subassembly 86. Sleeve 90 has a mold-cavity-defining interior surface recess 100 of a configuration to cooperate with exterior surface configuration of core pin 80 to thereby mold form the upper end 20 and the outer surface of spout 18. The lower exterior portion of sleeve 90 mold forms the interior surface of wall 16 and has a thread recess 102 in which the thread 32 is molded. As in the '659 patent, the length of the thread recess 102 is such as to provide at least two complete turns (i.e., 720°) so that in any axial section of the wall 16, there will always be at least two thread segments, regardless of where the axial section is taken throughout the entire 360° circumferential extent of wall 16. It will be seen that the upper end of the sleeve assembly 86 comprises the cap collar 88 that slidably encircles the core pin shank 82 and can move relative thereto between the end stops provided by shoulder ledges 94, 95 of the core pin subassembly.

In accordance with another principal feature of the method and apparatus of the present invention, the lower end surface 104 of sleeve 90 is modified so as to be configured frustoconically at a downwardly convergent cone angle to thereby define the injection mold cavity surface for mold forming the frustoconical upper surface 106 of the apron web 24 (FIG. 2). In addition, the upper surface of the extrusion mandrel 54 is modified so as to be configured to form a central, circular, planar recessed surface 108 that abuts the mating flat circular lower end face 110 of core pin head 80, as shown in FIG. 3, when the extrusion/injection die head tooling 50 is operably engaged with the neck ring tooling 60 of injection tooling 58 to perform the injection molding operation. The mandrel recessed end surface 108 is surrounded by an annular frustoconical mandrel surface 112 that is configured to define the injection mold cavity surface that mold forms both the undersurface 114 of web 24 (FIG. 5) and the integral bottom edge 26 of spout 18. This occurs upon mold closure when extrusion die head 50 is oriented to complete the injection mold cavity in cooperation with sleeve 90 and the exterior mold cavity surface of core pin head 80, and with head 80 in abutment with its head face 110 seating tightly on mandrel surface 108.

Upon completion of the injection molding step of FIG. 3, the injection mold is raised from orifice 56 of extrusion/injection die head 50 while a length of heated and plasticized tubing is being extruded through the extrusion orifice 56. This tubing is integrally connected to the injection molded finish formed as shown in FIG. 3 and is therefore drawn upwardly as the tubing is extruded. After the proper length of tubing has been extruded, and referring to FIG. 4, the blow mold halves 74, 76 close around the tubing and then air is introduced through the injection mold assembly via passageway 72 to expand the tubing in the closed mold to form the remainder of the container, as set forth in more detail in the aforementioned U.S. Pat. No. 2,804,654.

Following blowing of the body portion 11 of container 10, spout 18, apron web 24 and finish wall 16 may be removed from the neck ring assembly 60. This is normally done after the halves 74, 76 of the blow mold in which body portion 11 was molded have been opened. Such removal is accomplished by the sequence of the steps described in conjunction with FIGS. 11 through 13 of the aforementioned '659 patent, which is incorporated herein by reference and not repeated. However, it is to be noted that the present invention, despite modifying the '654 machine mandrel and core pin tooling to form the frustoconical web wall 24, still retains the advantage of enabling stripping of the threads 32 of the finish with minimal distortion. This stripping process is believed to be also enhanced by retaining the broad shoulder configuration of container body 11 at its junction with the container finish in combination with the smaller diameter spout 18, as contrasted with the narrow neck bodies and larger diameter spouts of the aforementioned U.S. Pat. No. 4,989,757.

SECOND EMBODIMENT ONE-PIECE SELF-DRAINING CONTAINER

FIG. 5 illustrates a second embodiment one-piece self-draining container 10' of the invention in which those elements identical to those of container 10 are given like reference numerals, and those elements alike in function are given like reference numerals raised by a prime suffix, and their description not repeated. As will be seen by comparing FIGS. 2 and 5, the second embodiment container 10' differs only with respect to the configuration of the apron web wall 24'. Web wall 24' is tapered downwardly at a slant so that its lowest region is centered on the spout opening at the gap edges 30' diametrically opposite the pouring lip 20 of spout 18'. In essence, the cone axis of wall 24' is tilted non-parallel to the central longitudinal axis of body 11 or neck wall 16 by about 10°, and hence the lower edge 26' of spout 18' is likewise inclined as shown in FIG. 5 to match this chance in configuration of the apron web 24'. This reconfiguration of the embodiment of FIG.5 further promotes gravity-induced drainage of product by making the area of apron 24' leading into the rear spout gap opening 30 the lowest region of the drain apron gutter when the spout is in its normal upright position.

SECOND EMBODIMENT METHOD AND APPARATUS

Figure 6:
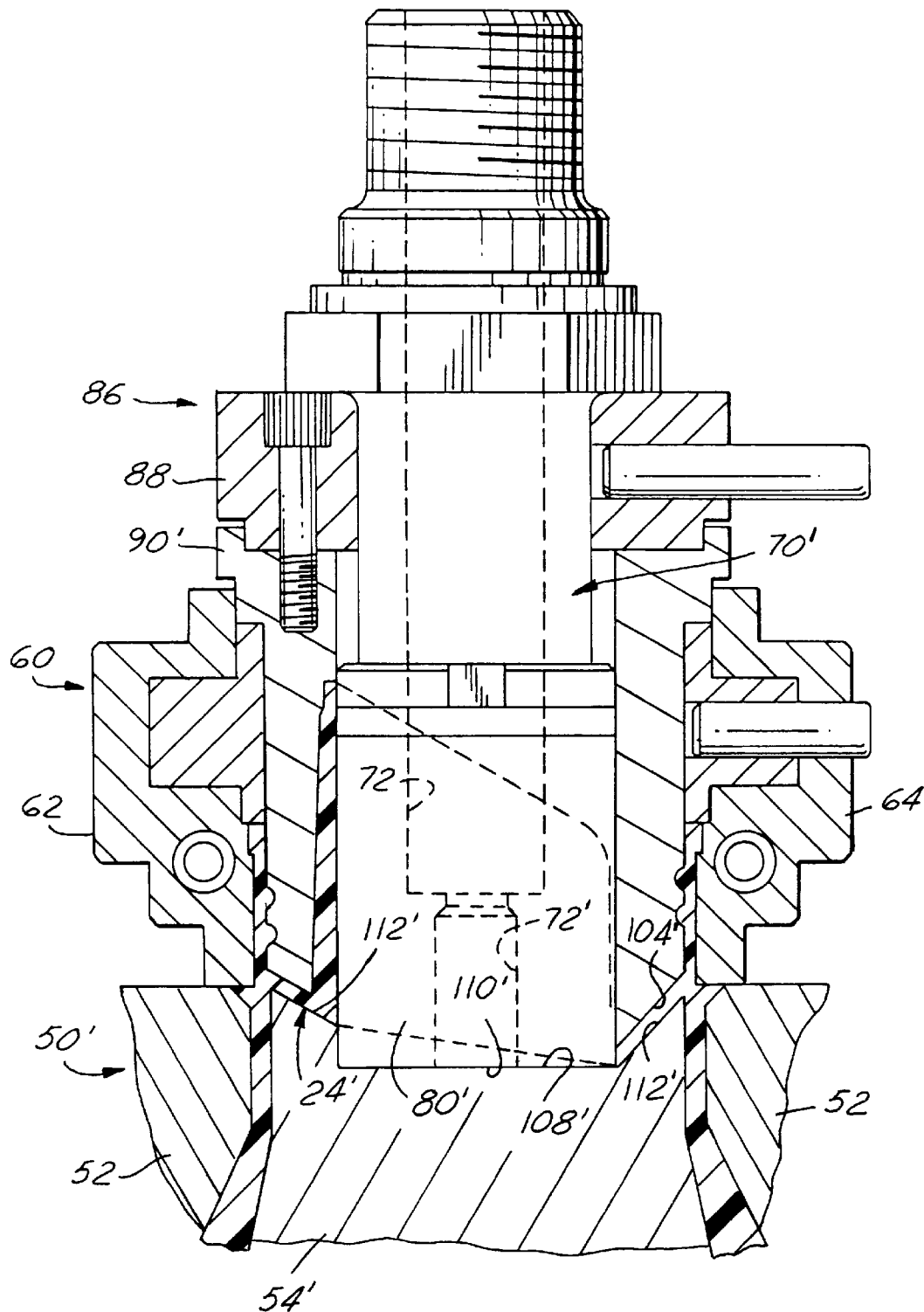
FIG. 6 is a fragmentary cross-sectional view similar to that of FIG. 3 and illustrating a further modification to the tooling of a '654 type machine in accordance with the invention to produce the second embodiment DBS container of FIG. 5.

FIG. 6 shows a second embodiment of '654 machine extrusion tooling and neck ring injection tooling as modified in accordance with the invention in order to produce the container 10' of FIG. 5. It will be seen that those elements identical to those previously described are given like reference numerals and their description not repeated, and those elements alike in function but modified are given like reference numerals raised by a prime suffix. It will be seen that the only changes needed to accomplish the revised embodiment of FIG. 5 is to modify the upper end face configuration of mandrel 54' and likewise the corresponding lower surface of finish insert sleeve 104'. The lower end head 80' of mold core 70' will fit into a recess in the top surface of mandrel tip 54'. The lower finish insert sleeve surface 104' and the top mandrel tip surface 112' have mating slopes to maintain a substantially uniform gap to allow for a consistent material thickness on web 24'. The opposing faces 108, 110' of mandrel 54' and head 80' are horizontal rather than angulated, which eliminates any side loading problems that might otherwise occur in the tooling.

From the foregoing description and the drawing figures as referenced therein, it will be apparent to those skilled in the art that the improved one-piece self-draining container of the invention, and the improved method and apparatus for making the same in accordance with the invention, amply fulfill the aforestated objects and provide many advantages over the prior art. The pour spout 18, 18' is integrally joined to the container, i.e., made in one piece with the container as molded, and is integrally joined to the surrounding container neck by a drip collecting apron web or ledge that is tapered or angulated downwardly at a steep angle throughout its circumference, thereby providing an improved drain gutter contour better promoting product drippage flow toward the reduced diameter pour spout to encourage gravity-induced flow of liquid back into the container. Yet the advantages of a molded-in spout are retained, as are the advantages of the improved thread definition of the aforementioned U.S. Pat. No. 5,114,659. Thus, the problem in the '659 patent of the product remaining inside the finish area because the ledge formed at the base of the spout is nearly flat is overcome because of the improved ability of the product to drain back into the container due to the greatly increased slope angle of the frustoconical configuration of the ledge web 24 or 24' toward the spout and therearound to the gap opening 30 at the rear of the spout.

Moreover, this improved container drain gutter configuration is obtained by utilizing the already existing '654 type blow molding machines with only minor modifications thereto. As illustrated in FIGS. 3 and 6, only the upper face of mandrel 54 need be machined and ground to the recessed configuration of either FIG. 3 or FIG. 6. Likewise the head 80 or 80' of the core pin assembly 70 or 70' needs to be replaced with an axially elongated head, the finish insert sleeve 90 or 90' modified by extending the sleeve axially, and contouring the sleeve bottom surface 104 or 104' to correspond with the contour of mandrel tip surface 112 or 112'. All the remaining components of the machine remain unchanged, and the cycle of operation of the machine is not affected Despite the improved configuration of the web wall 24 or 24', the cross sectional thickness of the web wall remains uniform and relatively thin so as to not affect machine cycle time.

Thus, as will be appreciated by those skilled in the art, many revisions and changes may be made to the various elements of the preferred embodiments of the selfdraining container and its method and apparatus for manufacture described above, including numerous modifications in configuration and shape styles, without thereby departing from the principles of the invention and scope of the following claims.

What is claimed is:

1. In a self-draining container molded in one piece having
a body portion;
an integrally formed neck defining a cylindrical opening having a predetermined diameter, said neck formed in situ with and extending upwardly from said body portion, a dispensing spout formed integral and in situ with and at least partially encircled by said neck, at least a portion of said dispensing spout being a section of cylinder having an external surface with a diameter less than said predetermined diameter, said dispensing spout having a circumferential extent of at least 180° but less than 360° and presenting opposing edges which define a gap at the lower end of said spout, and an integrally formed annular finish wall encircling said spout in spaced relation thereto;
an apron web integrally connecting said annular finish wall and said spout to said neck, said web being formed in situ with said annular finish wall and dispensing spout and cooperating therewith to define a channel for receiving liquids draining from said dispensing spout when the container is moved from an inverted dispensing position to an upright position;
said apron web having generally parallel upper and lower wall surfaces sloping downwardly toward said spout in the container upright position;
said web extending upwardly and outwardly from the lower end of said spout extending upwardly from said web along an axis generally parallel to the axis of said neck;
said web having a substantially uniform cross-sectional thickness throughout its radial and circumferential extent encircling said spout;
said gap providing an opening through which liquids may flow from said channel to said neck and body portion when the container is upright, said container being manufactured by a process in which at least the portions of the container comprising the neck, dispensing spout, annular finish wall, web and said gap through which liquids flow are formed and joined integrally by molding in a first mold by injection molding in one operation and the body is thereafter integrally formed and joined integrally with those portions injection mold formed in the first mold by extruding a length of tubing joined at one end thereof to an extending integrally from said finish portion and the tubing is thereafter blown to form the container body portion by blow molding in a second mold but in the same molding machine apparatus in which the injection molding is performed with no post-molding operations required for those portions injection mold formed in the first mold.

2. A self-draining container as defined in claim 1 wherein said web has a frustoconical configuration with a cone angle of about 30°.

3. A self-draining container as set forth in claim 2 wherein the axis of said web is oriented generally parallel to the axis of said spout.

4. A self-draining container as set forth in claim 2 wherein the axis of said web is oriented to tilt away from the axis of said spout in an upwardly divergent direction and inclined toward said spout gap.

5. A one-piece plastic container having a body portion integrally joined to a dispensing finish portion including a dispensing spout, an apron gutter web and a cylindrical finish wall, said container being formed by a process in which (a) there is formed and integrally joined by injection molding
(i) said upwardly extending dispensing spout;
(ii) said web extending radially outwardly from the lower end of said dispensing spout; and
(iii) said cylindrical finish wall spaced radially outwardly of and encircling said dispensing spout formed in situ and cooperating with said dispensing spout and said web to define an apron gutter channel into which liquid draining down the outside of said dispenser spout may be captured; and having opening means providing communication between the interior of said body portion and said channel; and said cylindrical finish wall having a predetermined diameter determining a cross-sectional size and having integrally molded closure retention means on the interior surface thereof;

(b) there is formed by blow molding as part of the same process said body portion integral and in situ with and depending from the lower portion of said cylindrical finish wall, said body portion flaring outwardly from the lower end of said cylindrical finish wall to an area of enlarged cross-sectional size; and, (c) the improvement in combination therewith of said web being injection mold formed in step (a) to have generally parallel upper and lower wall surfaces sloping downwardly toward said spout in the container upright position, wherein said web extends upwardly and outwardly from the lower end of said spout, said spout extending upwardly from said web along an axis parallel to the axis of said neck, wherein said web has a substantially uniform cross-sectional thickness throughout its radial and circumferential extent encircling said spout and wherein, and, after those container portions that have been formed by injection molding in step (a) are completely injection molded, in step (b) a blowable parison is thereafter integrally formed with the finish portion by extruding a length of tubing having its upper mold joined integrally to said finish wall and the tubing is thereafter blown to form the body portion.

6. A self-draining container as defined in claim 5 wherein said web has a frustoconical configuration with a cone angle of about 30°.

7. A self-draining container as set forth in claim 6 wherein the axis of said web is oriented generally parallel to the axis of said spout.

8. A self-draining container as set forth in claim 6 wherein the axis of said web is oriented to tilt away from the axis of said spout in an upwardly divergent direction and inclined toward said spout gap.

* * * * *